Patented Sept. 13, 1938

2,129,749

UNITED STATES PATENT OFFICE 2,129,749

MOLDING COMPOSITION

Edward Henry George Sargent, Hull, England, assignor to Reckitt & Sons Limited, Hull, England, a corporation of England No Drawing. Application June 5, 1936, Serial No. 83,732. In Great Britain June 14, 1935

2 Claims. (Cl. 260—7)

The present invention relates to the production of synthetic resin molding compositions which are capable of being converted into powder for use as molding powders. More particularly the invention is concerned with compositions obtained from crude tar acids and especially from ordinary commercial cresylic acid and formaldehyde. By ordinary commercial cresylic acid I mean any grade of cresylic acid obtainable by simple distillation of coal tar without reference to the relative percentages of the isomers—ortho, meta and para cresols—contained therein.

The process of obtaining a molding composition by condensing together cresylic acid and formaldehyde using definite proportions of caustic alkali as a condensing agent is well known and has been the subject of many patent specifications, but it has been found by experiment that using ordinary commercial cresylic acid none of these processes produces a commercially acceptable product, although I am aware that if specially selected cresylic acids, containing little or no ortho-cresol are used, acceptable molding powders can be produced. There have also been many proposals for the use of proteins in plastic masses but the object of all the latter proposals has been the production of hard substances which are infusible and which cannot be converted into thermosetting molding powders.

The object of the present process is the production of a composition for converting into a molding powder which can be very rapidly prepared from cheap materials, which is moldable by heat and pressure without the further additions of hardening agents such as lime, hexamine or paraformaldehyde, and more rapidly and at a lower temperature than those compositions hitherto proposed, and which does not contain free phenolic bodies and so does not readily discolour and is exceptionally chemically inert.

According to the present invention a molding composition is produced by condensing together tar acids, preferably ordinary commercial cresylic acid and formaldehyde, with the use of a small quantity of an alkaline or acid dispersion of a protein as the condensing agent. The preferred protein employed is that obtained from rice, but proteins obtained from soya bean, wheat, maize, milk, glue or other materials may be used. The yield of resinous compositions from such cresylic acid and formaldehyde mixtures is definitely increased by the addition of protein amounting to as little as 5% of the cresylic acid. An excess of protein over that which can be effectively dispersed by the alkali may be present in the composition if desired up to 50% of the cresylic acid used. The protein is conveniently dispersed by using say five times its volume of water and the requisite alkali or acid and heating it for say half an hour at around 95–98° C. In any case hydrolysis of the protein should be incomplete.

As an example of carrying out the process the following illustration is given:—

Five to fifty parts by weight of a protein are dispersed or partially dispersed according to the amount of protein taken, in a suitable volume of water by not more than two parts by weight of caustic soda, or its equivalent weight of caustic potash, ammonia, sodium carbonate, sodium phosphate or any other suitable alkali, and the dispersion so obtained is added to one hundred parts by weight of crude tar acids, preferably ordinary commercial cresylic acid as above defined, and seventy to one hundred parts of an aqueous solution of formaldehyde (containing 35–40% by weight of actual formaldehyde).

If it is desired to condense with acid, up to two parts of acid are used in place of the recommended alkalies in the above process.

The acid may be mineral acid—or a substance producing a mineral acid solution when added to water— or an organic acid such as formic, acetic, oxalic acid or a halogen substituted acid such as chlor-acetic acid.

The whole is now well stirred and the mixture condensed at a temperature about 95–100° C. for a suitable time, usually about one hour. The resulting product is washed free of the residual reactive liquor by treatment with concentrated hydro-chloric acid and then dried at a low temperature. The product without further treatment may be ground, mixed with dyes and fillers and used as a molding powder.

What I claim is:—

1. A process for preparing a molding composition which consists in dispersing 5 to 50 parts by weight of a protein in water by not more than 2 parts of alkali, adding the dispersion to 100 parts of cresylic acid and 70 to 100 parts of a 35–40% aqueous solution of formaldehyde, condensing by stirring and heating the mixture to about 95° to 100°, washing the condensed product with concentrated hydrochloric acid, and drying the product at low temperature.

2. A process according to claim 1 in which the product is ground and mixed with dyes and fillers.

EDWARD HENRY GEORGE SARGENT.